(12) United States Patent
Desnoe et al.

(10) Patent No.: US 9,567,949 B2
(45) Date of Patent: Feb. 14, 2017

(54) AIR CLEANER IN PARTICULAR OF AN INTERNAL COMBUSTION ENGINE

(71) Applicant: MANN+HUMMEL GMBH, Ludwigsburg (DE)

(72) Inventors: Willy Desnoe, Lezigne (FR); Gurvan Nabucet, Angers (FR)

(73) Assignee: MANN+HUMMEL GMBH, Ludwigsburg (DE)

( * ) Notice: Subject to any disclaimer, the term of this patent is extended or adjusted under 35 U.S.C. 154(b) by 92 days.

(21) Appl. No.: 14/593,405

(22) Filed: Jan. 9, 2015

(65) Prior Publication Data

US 2016/0201618 A1    Jul. 14, 2016

(51) Int. Cl.

| | | |
|---|---|---|
| *B01D 39/00* | (2006.01) |
| *B01D 46/00* | (2006.01) |
| *B01D 47/00* | (2006.01) |
| *B01D 53/00* | (2006.01) |
| *B01D 39/06* | (2006.01) |
| *B01D 59/50* | (2006.01) |
| *B01D 50/00* | (2006.01) |
| *F01N 3/00* | (2006.01) |
| *F02M 35/024* | (2006.01) |
| *B01D 46/52* | (2006.01) |
| *F02M 35/02* | (2006.01) |
| *B01D 46/10* | (2006.01) |

(52) U.S. Cl.
CPC .... *F02M 35/02416* (2013.01); *B01D 46/0006* (2013.01); *B01D 46/10* (2013.01); *B01D 46/521* (2013.01); *F02M 35/0201* (2013.01); *B01D 2265/028* (2013.01)

(58) Field of Classification Search
CPC ......... B01D 39/00; B01D 46/00; B01D 47/00; B01D 53/00; B01D 39/06; B01D 59/50; B01D 50/00; F01N 3/00
USPC .......... 55/493, 498, 502, 523, 385.1, 385, 3; 60/297
See application file for complete search history.

(56) References Cited

U.S. PATENT DOCUMENTS

| | | | |
|---|---|---|---|
| 5,649,986 A | | 7/1997 | Mueller |
| 5,730,768 A | * | 3/1998 | Kaminaga .......... B01D 46/0004 55/385.3 |
| 8,394,158 B2 | * | 3/2013 | Shimomura ....... F02M 35/0203 55/385.3 |

(Continued)

FOREIGN PATENT DOCUMENTS

| | | |
|---|---|---|
| DE | 102007063252 A1 | 7/2009 |
| DE | 102008036913 B3 | 11/2009 |

*Primary Examiner* — Jacob T Minskey
*Assistant Examiner* — Minh-Chau Pham
(74) *Attorney, Agent, or Firm* — James Hasselbeck

(57) ABSTRACT

An air cleaner of an internal combustion engine has a housing with a slide-in opening and receives a slide-in filter element through this opening. A cover element closes off the slide-in opening. The cover element has a snap element for fixing the cover element at the housing. The cover element has a contact face defining a first main plane. A sealing is disposed between the filter element and the housing and seals between filter element and housing. A sealing face provided at the housing interacts with the sealing and defines a second main plane. The housing has a contact face abutting the contact face of the cover element in the closing state of the cover element. An angle between the second main plane of the sealing face of the housing and the first main plane of the contact face of the cover element is different from 90°.

12 Claims, 8 Drawing Sheets

(56) References Cited

U.S. PATENT DOCUMENTS

| | | | |
|---|---|---|---|
| 8,679,212 B2* | 3/2014 | Ushiyama | B01D 46/0005 55/385.1 |
| 8,728,192 B2* | 5/2014 | Metzger | B01D 46/0004 55/385.1 |
| 2008/0110146 A1* | 5/2008 | Germain | B01D 46/0005 55/385.3 |
| 2008/0202451 A1 | 8/2008 | Taniuchi et al. | |
| 2008/0216455 A1 | 9/2008 | Aizawa et al. | |

* cited by examiner

AIR CLEANER IN PARTICULAR OF AN INTERNAL COMBUSTION ENGINE

CROSS-REFERENCE TO RELATED APPLICATIONS

This application is a continuation application of international application No. PCT/EP2013/059570 having an international filing date of 8 May 2013 and designating the United States, the international application claiming a priority date of 9 Jul. 2012, based on prior filed European patent application No. 12 290 229.9, the entire contents of the aforesaid international application and the aforesaid European patent application being incorporated herein by reference.

BACKGROUND OF THE INVENTION

The present invention relates to an air cleaner in particular of an internal combustion engine in particular of a motor vehicle, comprising a housing with a slide-in opening for inserting a slide-in filter element, a cover element for closing the slide-in opening, which comprises at least one one-piece snap element for fixing the cover element at the housing.

DE 10 2007 063 252 A1 discloses a slide-in air filter of an air conditioner of a vehicle. The air conditioner comprises an air blower for sucking in fresh ambient air or recirculating air from the vehicle interior. The air conditioner further comprises an air duct on the inlet side for the air in front of the air blower, which has a holding fixture for the slide-in air filter. The slide-in air filter comprises a slot and an air filter. The slot with the air filter is bendable around a bending axis. The bending axis is aligned parallel to a plane of insertion and at right angles to a direction of insertion.

It is an object of the invention to provide an air cleaner of the above-mentioned kind, which is capable of establishing an effective seal to impede a leakage of air in the air cleaner. Further, it should be easy to open and close the cover element.

SUMMARY OF THE INVENTION

The object is achieved in that an angle between a main plane of a sealing face of the housing for a sealing between the filter element and the housing and a main plane of a contact face of the cover element, at which a corresponding contact face of the housing abuts in a closing state of the cover element, is different from 90°.

Favorably, the main planes of the sealing face and the contact face are not perpendicular. So, a component of a force realized by the at least one snap element for pressing the cover element against the housing also can realize a pressure of the filter element against the sealing face. In this way, the tightness of the sealing between the filter element in the housing and the tightness of the connection of the cover element and the housing both are improved. The main planes define the average orientation of the according faces each. This means that the faces themselves can have areas which extend in an angle to the according main plane. In particular, the faces can have a profiling along the main plane. The at least one snap element is realized in one piece with the cover element and so is loss-proof connected to the cover element. This simplifies an opening and closing process of the cover element. Further, separate snap elements, in particular screws or tension springs, are not necessary. Favorably, the at least one snap element can be easily realized in one production step together with the cover element. Advantageously, the cover element and the at least one snap element are made of plastic. With plastic, elastic snap elements can be realized easily. The cover element with the at least one snap element also can be made of a material different from plastic.

According to a favorable embodiment of the invention, a tension force of the at least one snap element can realize a first force component, which is perpendicular to the main plane of the contact face of the cover element, and a second force component, which is perpendicular to the main plane of the sealing face of the housing. Advantageously, the tension force of the at least one snap element can be perpendicular to the main plane of the sealing face so that the second force component is identical with the tension force itself. The first force component can effect the pressure of the cover element against the housing so that the tightness of the connection between the cover element and the housing can be improved. The second force component can cause the pressure of the filter element against the sealing face of the housing so that the compression of the sealing between the filter element and the housing and thus the tightness can be improved.

Advantageously, an angle between a direction of a tension force of the at least one snap element and the main plane of the contact face of the cover element can be different from 90°, in particular the angle can be between 20° and 70°, preferably approximately 45°. Experiments have shown that at an angle between 20° and 70°, preferably approximately 45°, the effect of the tension force can improve the gas tightness of the contact area between the filter element and the sealing face as well as the gas tightness of the contact area between the cover element and the housing.

Favorably, an angle between a direction of a tension force of the at least one snap element and the main plane of the sealing face of the housing for the sealing between the filter element and the housing can be approximately 90°. So, a pressure for compressing the sealing and improving the sealing function between the filter element and the housing can be maximized.

According to a further favorable embodiment of the invention, a sealing element can be arranged between the contact face of the housing and the cover element. Advantageously, the sealing element can be flexible. Preferably, the sealing element can be made of an elastomer. With the sealing element, tolerances of the shape of the according contact faces of the cover element and the housing and/or the position of the cover element relative to the housing can be compensated. Further, the sealing function can be increased. Additionally, the sealing element can effect an acoustical decoupling of the cover element and the housing. Advantageously, the sealing element and the cover element can be realized as a two-component part. So, the sealing element can be loss-proof attached to the cover element. Additionally, the opening and closing of the cover element can be further simplified.

Advantageously, the slide-in opening can be arranged on a raw-gas side of the filter element. So, a suction of leak air into the housing through the slide-in opening to the clean-air side of the filter element can be impeded.

According to a further favorable embodiment of the invention, the cover element can be part of a drawer in which the slide-in filter element can be placed and which can be slid through the slide-in opening into the housing. The filter element can be placed easily and stably in the drawer. The drawer together with the filter element can be slid into the housing and placed precisely in its end position. So, even a filter element whose internal strength is not sufficient for pushing it on its own can be placed precisely and stably in the housing. Favorably, the drawer can have a frame for holding the filter element. The drawer can be permeable to gas at least in direction of the air flow through the filter element.

Favorably, at least one snap face, which can act as a counterpart for the at least one snap element, can be arranged at the housing. With this snap face, the tension force of the snap element can be transferred to the housing.

Further, at least one counter support for connecting the housing and the cover element can be arranged on an opposite side of the at least one snap face and the at least one snap element. In this way, the cover element can be clamped between the counter support and the at least one snap element. So the cover element can be pressed against the housing on opposite sides. Thus, the pressure of the cover element against the housing can be distributed all over the contact face. So, the tightness of the sealing further can be improved.

Advantageously, the at least one snap element can have at least one unlocking element for unlocking the fixation of the cover element at the housing. With the at least one unlocking element, the at least one snap element easily can be unlocked so that the cover element easily can be opened in particular for removing the filter element.

BRIEF DESCRIPTION OF THE DRAWINGS

The present invention together with the above-mentioned and other objects and advantages may best be understood from the following detailed description of the embodiments, without being restricted to the embodiments.

Figure 1:
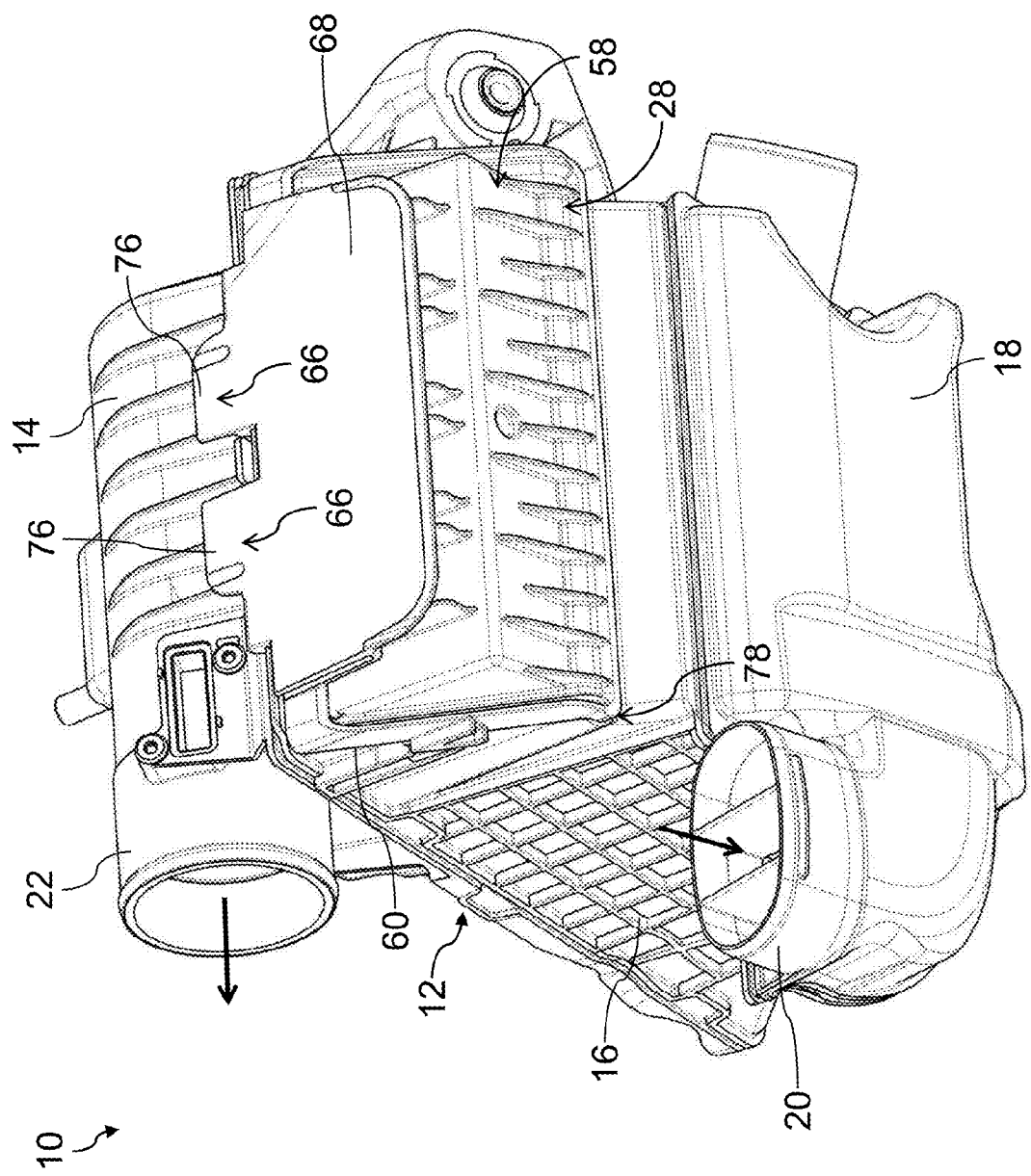
FIG. 1 is a first perspective view of an air cleaner of an internal combustion engine of a motor vehicle with a housing in which a drawer with a slide-in filter element is placed.
Figure 2:
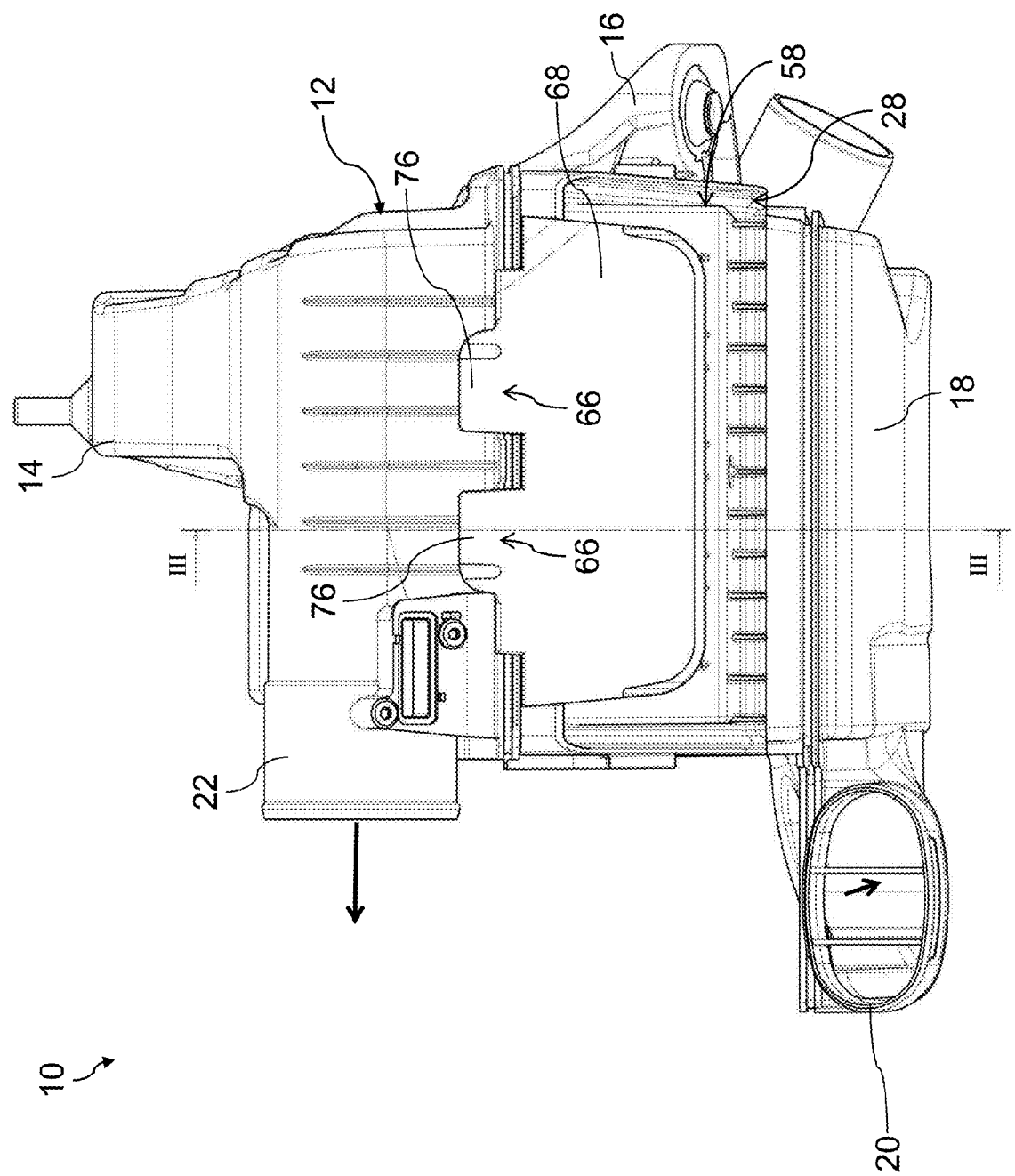
FIG. 2 is a second perspective view of the air cleaner of FIG. 1.

In the drawings, same or similar elements are referred to by same reference numerals. The drawings are merely schematic representations, not intended to portray specific parameters of the invention. Moreover, the drawings are intended to depict only typical embodiments of the invention and therefore should not be considered as limiting the scope of the invention.

DESCRIPTION OF PREFERRED EMBODIMENTS

In FIGS. 1 to 8, an air cleaner 10 of an internal combustion engine of a motor vehicle is depicted.

The air cleaner 10 has a housing 12 which comprises of an upper housing part 14, a lower housing part 16, and an inlet housing part 18. The upper housing part 14 is fixed at the lower housing part 16, for example, by welding. On the opposite side of the upper housing part 14, the inlet housing part 18 is fixed at the lower housing part 16, for example, by welding.

Figure 3:
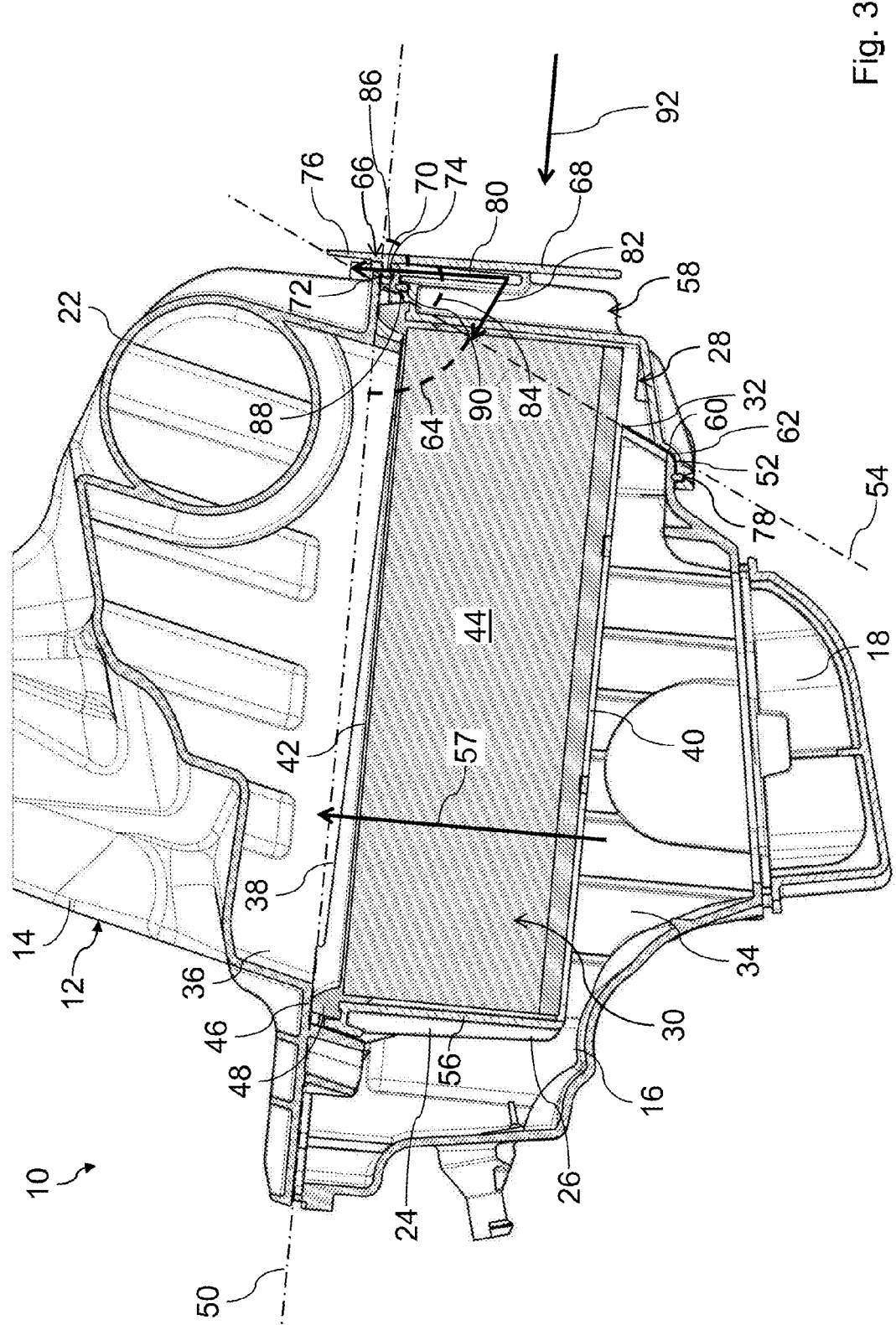
FIG. 3 is a cross-section of the air cleaner of FIG. 2 along the section line III-III of FIG. 2.
Figure 4:
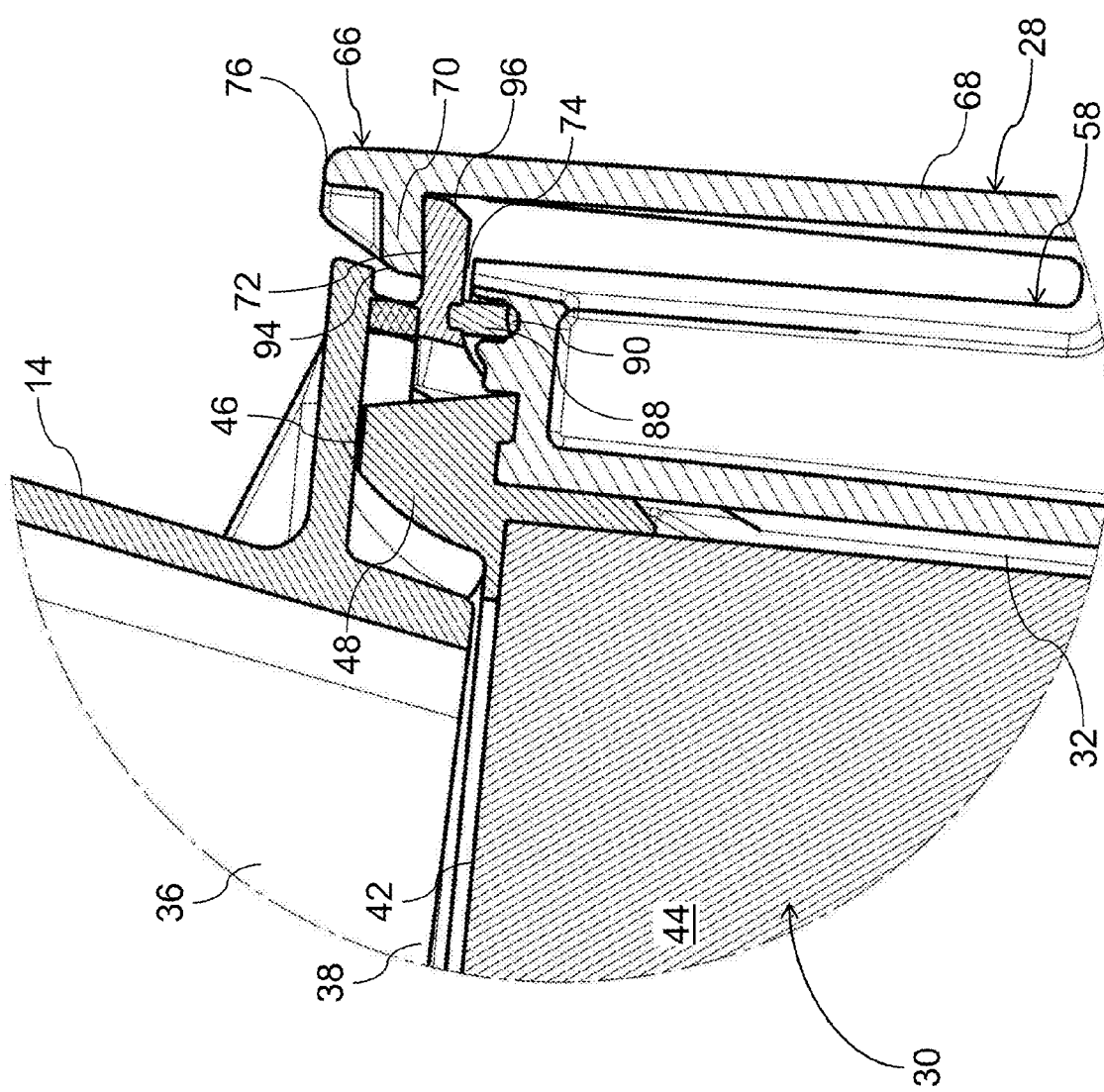
FIG. 4 is an enlarged view of the cross-section of the air cleaner of FIG. 3 of an area of a snap element for fixing a cover element of the drawer at the housing.
Figure 5:
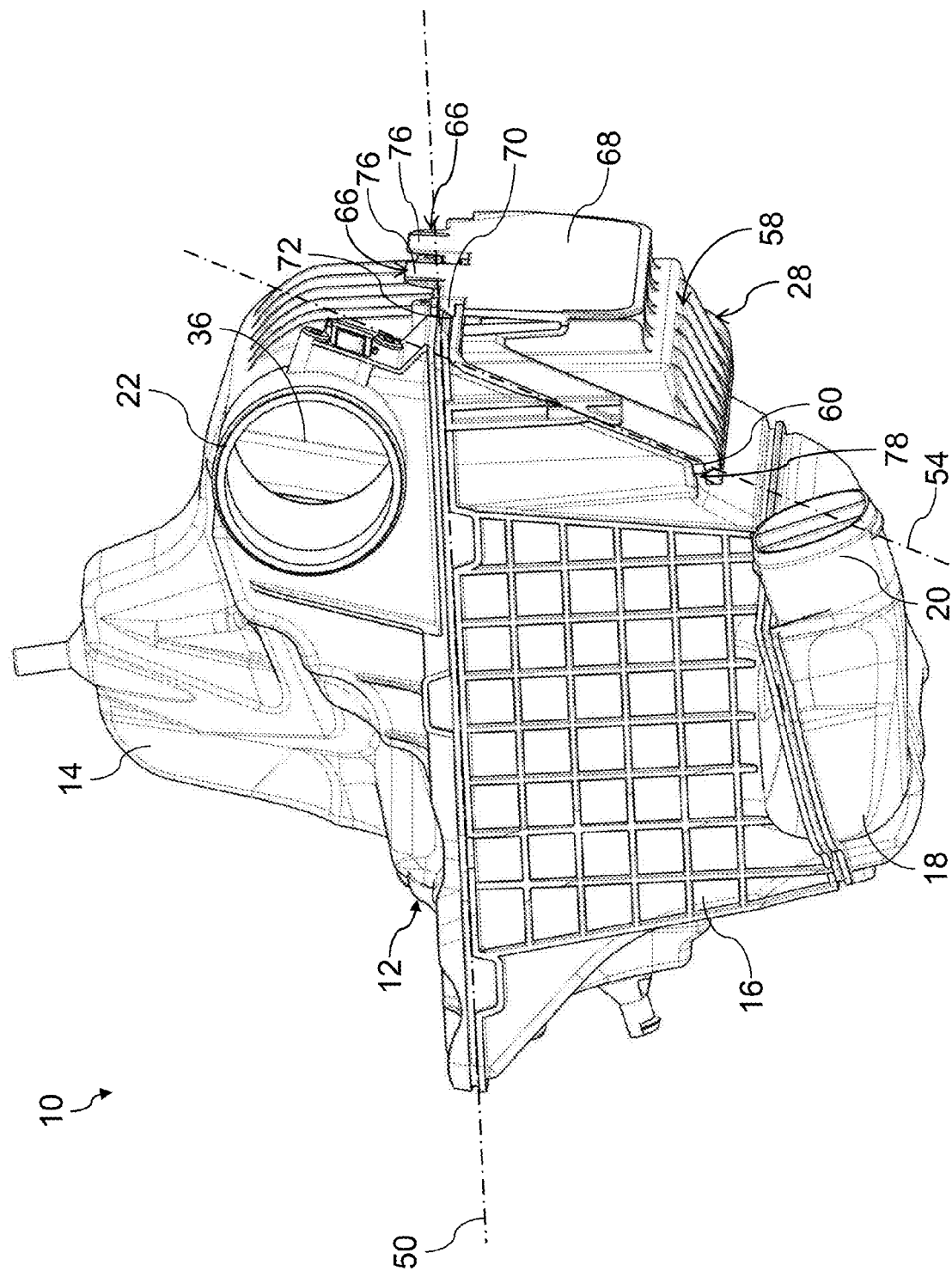
FIG. 5 is a third perspective view of the air cleaner of FIGS. 1 to 4 wherein the snap elements are shown in an unlocked state.
Figure 6:
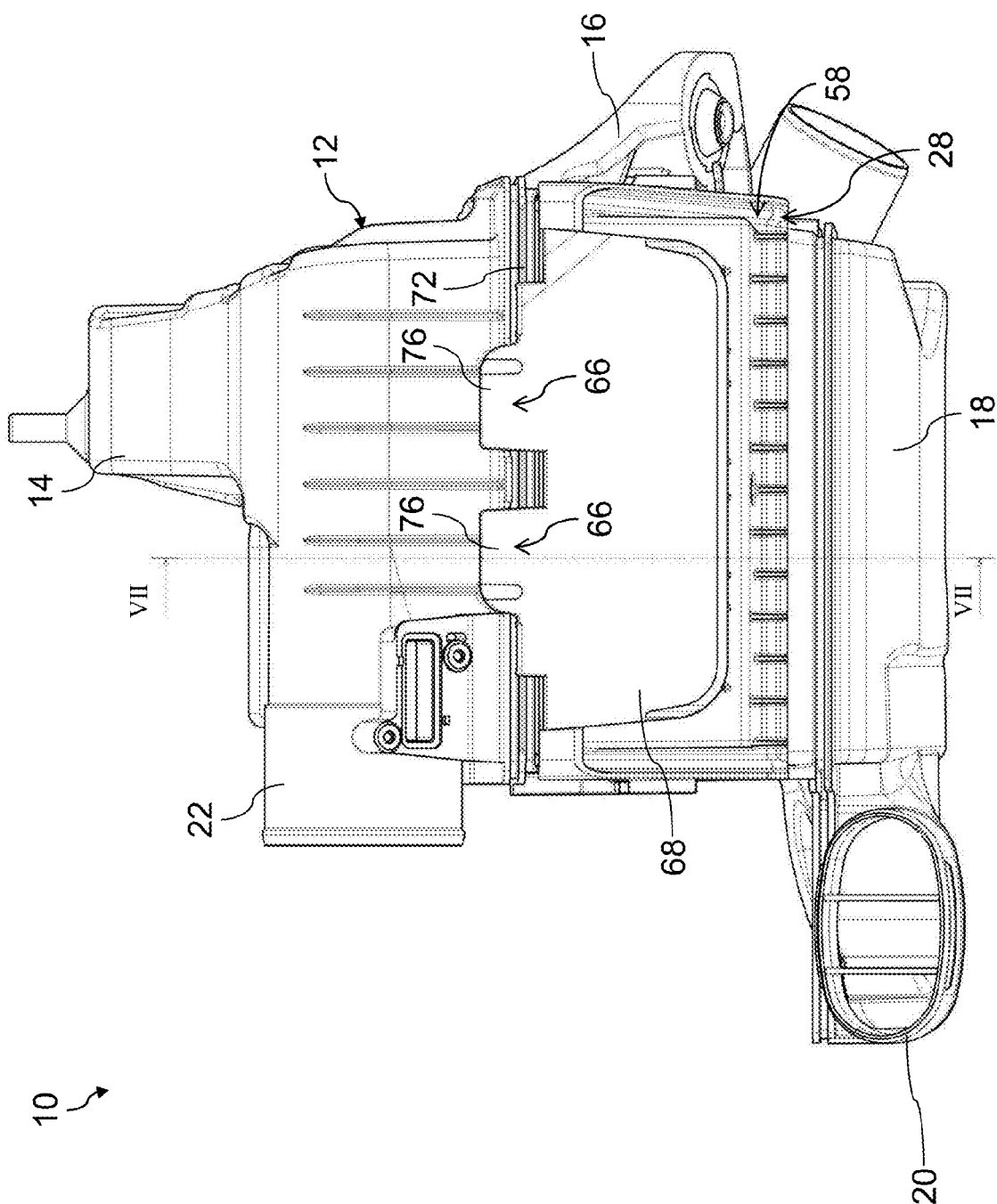
FIG. 6 is a perspective view of the air cleaner of FIG. 5 with the unlocked snap elements, with the view angle of FIG. 2.
Figure 7:
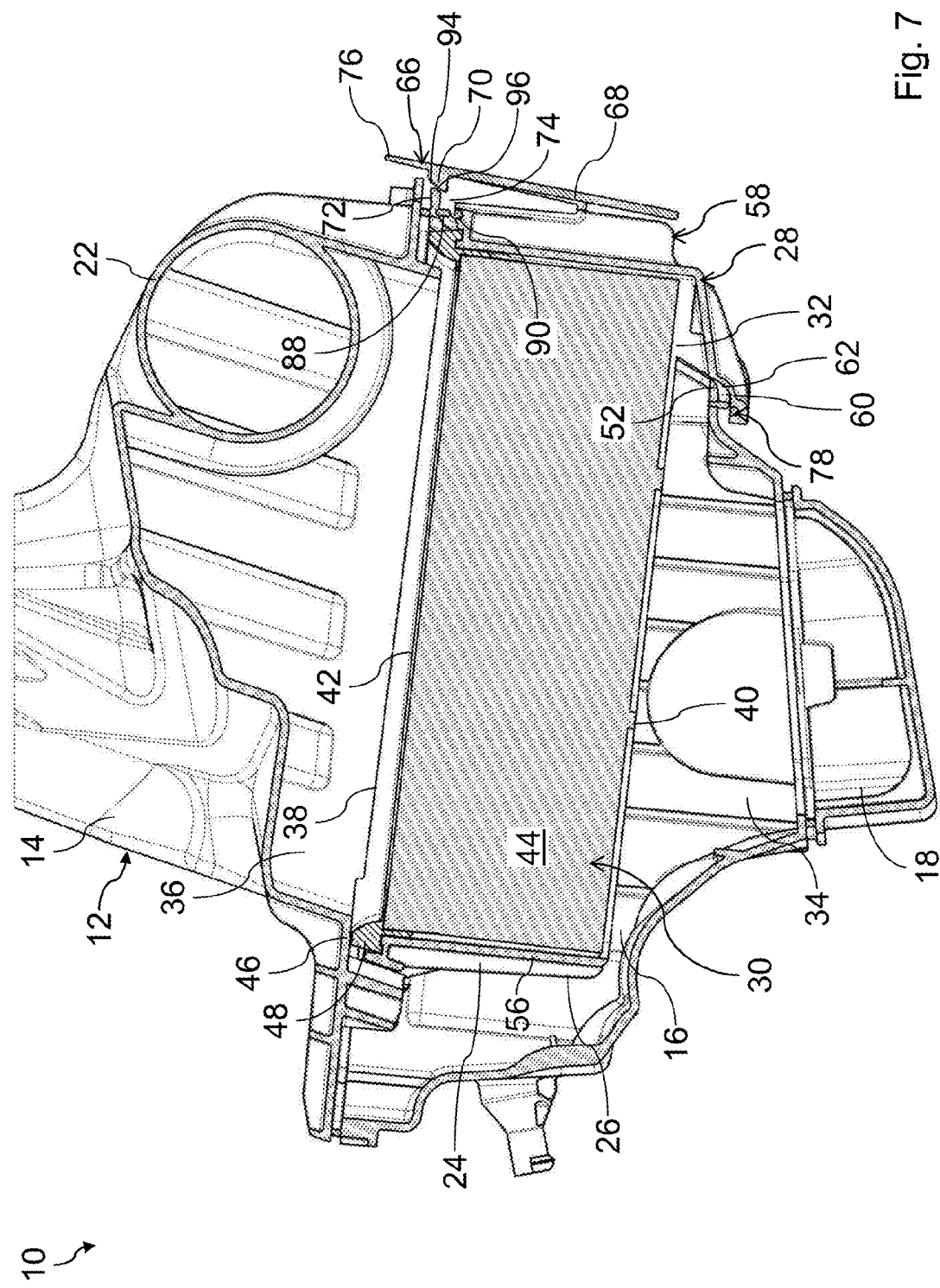
FIG. 7 is a cross-section of the air cleaner of FIG. 6 along a section line VII-VII of FIG. 6.
Figure 8:
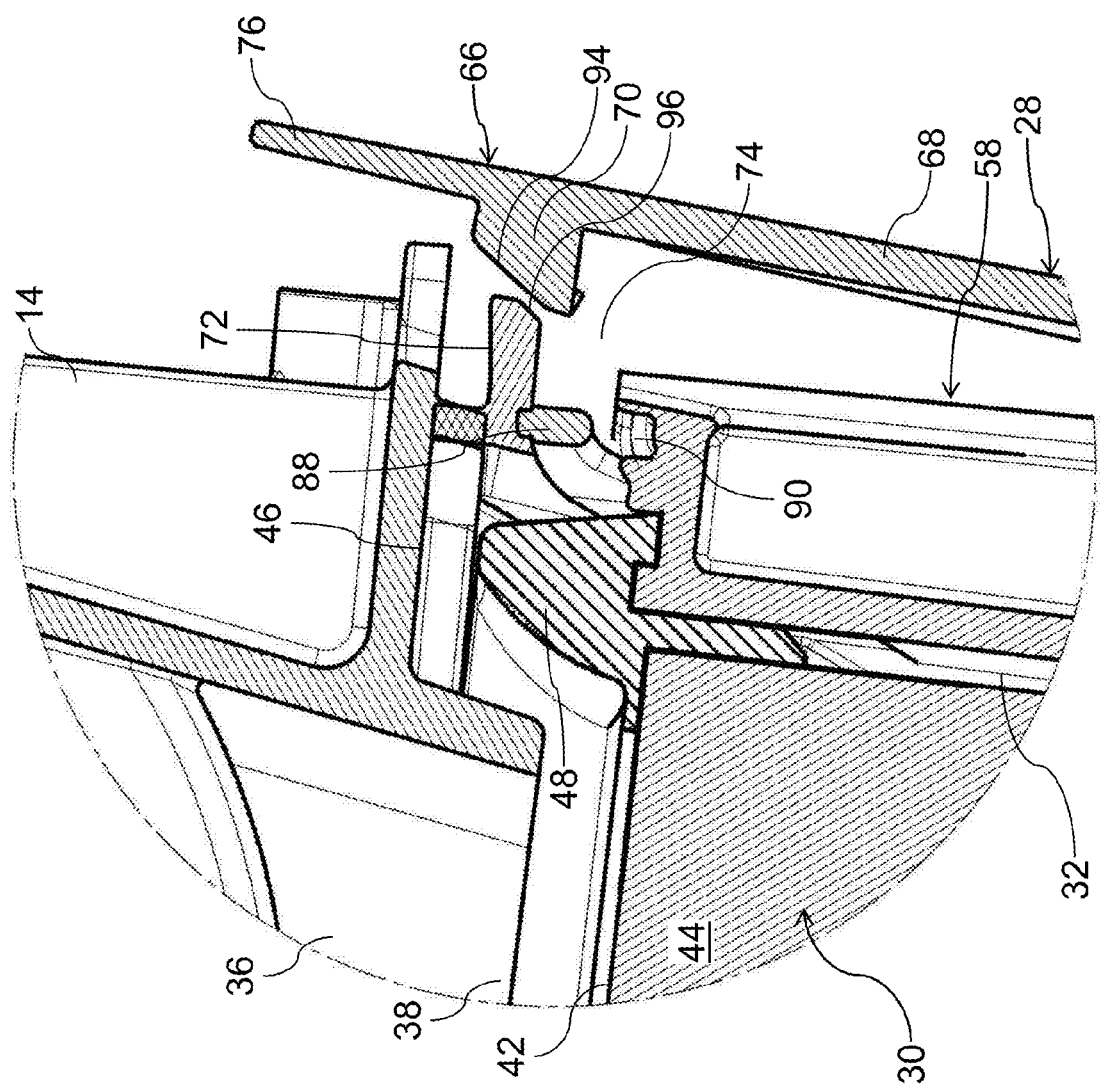
FIG. 8 is an enlarged view of the cross-section of the air cleaner of FIG. 7 of the area of the unlocked snap element.

The inlet housing part 18 has an inlet 20 for ambient air which has to be cleaned. The upper housing part 14 has an outlet 22 for the cleaned air. The lower housing part 16 has an air duct 24, which is shown in FIGS. 3 and 7, with a holding fixture 26 for a drawer 28. In the drawer 28, a slide-in filter element 30 is placed. The lower housing part 16 has a slide-in opening 32 for inserting the drawer 28 with the filter element 30 into the holding fixture 26.

An inlet chamber 34 of the lower housing part 16 is connected by an opening 38 with an outlet chamber 36 of the upper housing part 14. The filter element 30 is covering the opening 38 and so separates the inlet chamber 34 from the outlet chamber 36. The inlet 20 leads into the inlet chamber 34. The outlet 22 comes from the outlet chamber 36. The inlet chamber 34 and the slide-in opening 32 are on a raw-gas side 40 of the filter element 30. The outlet chamber 36 and the opening 38 are on a clean-gas side 42 of the filter element 30.

The filter element 30 has a pleated filter medium 44 which has an approximately cuboid shape. A circumferential elastic sealing 48 is fixed tight at an edge of the filter medium 44. The sealing 48 is faced toward a sealing face 46 of the housing part 14. In a locked state of the drawer 28, which is shown in FIGS. 1 to 4, the sealing 48 abuts gas-tightly against the sealing face 46. The sealing face 46 is surrounding the opening 38. The sealing 48 preferably can be made of polyurethane foam. The sealing face 46 has a main plane depicted in FIGS. 3 and 5 in broken line 50. The main plane 50 defines a main orientation of the sealing face 46. Preferably, the sealing face 46 is flat.

The slide-in opening 32 is surrounded by a contact face 52. The contact face 52 has a main plane is depicted in broken line 54 in FIGS. 3 and 4. The main plane 54 defines a main orientation of the contact face 52. Preferably, the contact face 52 is flat.

The drawer 28 is made of plastic. It has a frame 56 for holding the filter element 30. In flow direction of the air, the frame 56 is permeable to gas. The flow direction of the air is indicated in FIG. 3 with an arrow 57. Further the drawer 28 has a cover element 58, which is arranged in one piece with the frame 56. The cover element 58 has approximately the shape of a hollow cuboid, which is halved along one of its space diagonals. At its open edge, it has an elastomeric sealing element 60, which is realized as a two component part with the cover element 58. The face of the sealing element 60 realizes a contact face 62 of the cover element 58.

In a locked state of the drawer 28, the cover element 58 closes tightly the slide-in opening 32 of the lower housing part 16. The contact face 62 of the sealing element 60 abuts tightly on the contact face 52, which surrounds the slide-in opening 32. In the locked state, a main plane of the contact face 62 extends more or less along the main plane 54 of the contact face 52. For reason of clarity, in FIGS. 3 and 4 the main plane of the contact face 62 is indicated by the same broken line and has the same reference number as the main plane 54.

An angle 64 between the main plane 50 of the sealing face 46 and the main plane 54 of the contact face 62 of the cover element 58 is different from 90°. For example, the angle 64 is between 20° and 70°, preferably about 45°.

The cover element 58 comprises two snap elements 66 for fixing the cover element 58 at the housing 12. The snap elements 66 are realized in one piece each with a common plate 68. The common plate 68 is realized in one piece with the outer surface of the cover element 58. The common plate 68 with the snap elements 66 is flexibly pivoted at the cover element 68. Each snap element 66 has a snap tab 70 which extend in the locked state of the drawer 28 parallel to the main plane 50 of the sealing face 46.

A snap face 72 which acts as a counterpart for the snap elements 66 is connected to the upper housing part 14. The snap face 72 extends parallel to the main plane 50 of the sealing face 46. In the locked state of the drawer 28, the snap face 72 passes through a gap 74 between the snap elements 66 and an upper edge of the cover element 58.

The snap elements 66 each have an unlocking element 76 for unlocking the fixation of the cover element 58 at the housing 12.

A counter support 78 for connecting the lower housing part 16 and the cover element 58 is arranged on an opposite side of the snap face 72 and the snap elements 66. The counter support 78 comprises a support element on the side of the lower housing part 16 and a corresponding support element on the side of the cover element 58.

In the locked state of the drawer 28, a tension force 80 of the snap elements 66 each cause a first force component 82 which is perpendicular to the main plane 54 of the contact face 62 of the cover element 58. The tension forces 80 of the snap elements 66 themselves are perpendicular to the main plane 50 of the sealing face 46 of the housing 12 and so realize a second force component each. The angles between the tension forces 80 and the main plane 50 are indicated with the reference numeral 86.

An angle 84 between the direction of the tension force 80 of the snap elements 66 each and the main plane 54 of the contact face 52 of the cover element 58 are different from 90°. The angles 84 favorably are between 20° and 70°, preferably approximately 45°.

For replacing the filter element 30, the unlocking elements 76 are pulled away from the upper housing part 14. So, the snap tabs 70 are separated from the snap faces 72 each. The snap faces 72 get out of the gaps 74. This situation is shown in FIGS. 5 to 8. The drawer 28 with the filter element 30 is pivoting away from the sealing face 46 so that the sealing 48 can relax. A bar 88 for positioning, which is fixed at the opposite side of the snap face 72, gets out of an according groove 90 which is arranged in the upper edge of the cover element 68. The corresponding support elements of the counter support 78 on the side of the housing part 16 and the cover element 58 are separated. The drawer 28 is pulled out of the holding fixture 26 of the lower housing part 16 against a direction 92 of insertion. The filter element 30 is being replaced.

For closing, the drawer 28 is pushed in the direction 92 of insertion until the snap tabs 70 reach the snap faces 72. Then, the drawer 28 is pivoted towards the sealing face 46. Thereby, a front face 94 of the snap tabs 70, which are sloped like ramps, each are gliding along the according front faces 96 of the snap faces 72. The front faces 96 of the snap faces 72 are sloped accordingly. The snap tabs 70 engage the snap faces 72, the bar 88 for positioning engages the groove 90, and the support elements of the counter support 78 are combined. The sealing 48 and the sealing element 60 are compressed so that the opening 38 and the slide-in opening 32 are sealed tightly.

The invention is not limited to an air cleaner 10 of an internal combustion engine of a motor vehicle. The invention can also be applied to other kinds of air cleaners in particularly for vehicles. The invention can further be applied to other kinds of internal combustion engines, in particular for industrial engines.

The angle 86 between the direction of the tension forces 80 of the snap elements 66 each and the main plane 50 also can be different from 90°.

Instead of being pleated with an approximately cuboid shape, the filter medium 44 also can be shaped in a different kind. The filter medium 44 can also be flat without pleats.

The housing 12 can also have more or fewer than three housing parts 14, 16, 18.

Instead of welding, the housing parts 14, 16, 18 can be fixed together in another way, for example by gluing or by use of mechanical fixing parts, for example, screws or springs.

Instead of ambient air, also another gas, for example, recirculating air or recirculating exhaust gas can be cleaned by the air cleaner 10.

The sealing 48 can be made of a material different from polyurethane foam.

Instead of being flat, the sealing face 46 also can have a profiling or can be sloped relative to the main plane 50.

Instead of being flat, the contact face 52 also can have a profiling or can be sloped relative to the main plane 54.

More or fewer than two snap elements 66 can be used.

The cover element 58 can be realized without the sealing element 64.

The slide-in opening 32 also can be arranged on the clean-gas side 42 of the filter element 30.

The drawer 28 also can be made of a material different from plastic.

While specific embodiments of the invention have been shown and described in detail to illustrate the inventive principles, it will be understood that the invention may be embodied otherwise without departing from such principles.

What is claimed is:

1. An air cleaner of an internal combustion engine, the air cleaner comprising:
   a housing comprising:
      a first housing part having an air inlet port, the first housing part defining and inlet chamber therein;
      a second housing part having an outlet port for filter air, the second housing part defining an outlet chamber therein;
      wherein the second housing part is closed upon and affixed onto the first housing part such that the outlet chamber and inlet chamber are joined to form a housing interior chamber enclosed within the first and second housing parts;
      wherein the housing has a slide in opening in a first lateral sidewall of the housing, the slide-in opening, opening into the housing interior chamber arranged between the first and second housing parts;
      at least one snap face provided on the housing proximate to the slide-in opening;
   a removable drawer member slideably insertable into and slideably removable from the housing though the slide-in opening, the removable drawer member including:
      a drawer frame configured to receive and support a filter element therein, wherein, when in an inserted and locked state of the draw member, the drawer frame extending across the housing interior chamber between the first lateral wall and an opposing second lateral wall of the housing;
      a cover element arranged on a first lateral end of the drawer frame, the cover element sized and configured to close off the slide-in opening of the housing when in the inserted and locked state of the draw member;

the cover element forming a common plate spaced outwardly away from an outer surface of the cover element, the common plate flexibly moveable on the cover element relative to the housing, the comment plate formed together with the cover element as unitary component;

at least one snap element arranged on the common plate and lockably engaging with respective ones of the at least one snap face of the housing, locking the drawer member into the locked state in the housing interior chamber of the housing.

2. The air cleaner of an internal combustion engine according to claim 1, wherein the cover element has a contact face defining a first main plane;

a sealing disposed between the filter element and the housing and adapted to seal between the filter element and the housing;

a sealing face provided at the housing and adapted to interact with the sealing, wherein the sealing face defines a second main plane;

wherein the housing has a contact face abutting the contact face of the cover element in the closing state of the cover element;

wherein a first angle between the second main plane of the sealing face of the housing and the first main plane of the contact face of the cover element is different from 90 degrees.

3. The air cleaner according to claim 2, wherein a tension force of the at least one snap element generates a first force component and a second force component, wherein the first force component is perpendicular to the first main plane of the contact face of the cover element and wherein the second force component is perpendicular to the second main plane of the sealing face of the housing.

4. The air cleaner according to claim 3, wherein a second angle between a direction of the tension force of the at least one snap element and the first main plane of the contact face of the cover element is different from 90 degrees.

5. The air cleaner according to claim 4, wherein the second angle is between 20 degrees and 70 degrees.

6. The air cleaner according to claim 5, wherein the second angle is approximately 45 degrees.

7. The air cleaner according to claim 4, wherein a third angle between the direction of the tension force of the at least one snap element and the second main plane of the sealing face of the housing is approximately 90 degrees.

8. The air cleaner according to claim 2, further comprising a sealing element arranged between the contact face of the housing and the cover element.

9. The air cleaner according to claim 2, wherein the slide-in opening is arranged on a raw-gas side of the filter element.

10. The air cleaner according to claim 2, wherein at least one counter support is arranged on an end of the cover element opposite the at least one snap element is adapted to connect said end of the cover element to the housing at an opposite side of the slide-in opening relative to the at least one snap face.

11. A filter element comprising a pleated filter medium and a circumferential elastic sealing, wherein the filter element is adapted to be inserted into a removable drawer member of an air cleaner according to claim 2.

12. The air cleaner according to claim 1, wherein the cover element is formed in one piece together with drawer frame as a single unitary component.

* * * * *